US009846836B2

(12) United States Patent
Gao et al.

(10) Patent No.: US 9,846,836 B2
(45) Date of Patent: Dec. 19, 2017

(54) MODELING INTERESTINGNESS WITH DEEP NEURAL NETWORKS

(71) Applicant: MICROSOFT TECHNOLOGY LICENSING, LLC, Redmond, WA (US)

(72) Inventors: Jianfeng Gao, Woodinville, WA (US); Li Deng, Redmond, WA (US); Michael Gamon, Bellevue, WA (US); Xiaodong He, Issaquah, WA (US); Patrick Pantel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 14/304,863

(22) Filed: Jun. 13, 2014

(65) Prior Publication Data

US 2015/0363688 A1 Dec. 17, 2015

(51) Int. Cl.
*G06N 3/08* (2006.01)
*G06N 3/04* (2006.01)
*G06F 17/30* (2006.01)

(52) U.S. Cl.
CPC ......... *G06N 3/04* (2013.01); *G06F 17/30967* (2013.01); *G06N 3/0427* (2013.01); *G06N 3/082* (2013.01)

(58) Field of Classification Search
CPC ..................................................... G06N 3/04
(Continued)

(56) References Cited

U.S. PATENT DOCUMENTS 6,047,277 A * 4/2000 Parry ................... G06Q 10/107
706/14
7,810,035 B2 10/2010 Dominowska et al.
(Continued)

FOREIGN PATENT DOCUMENTS

JP 2010020739 A 1/2010

OTHER PUBLICATIONS

Kohonen et al., "Self Organization of a Massive Document Collection", IEEE Transactions on Neural Networks, vol. 11, No. 3, May 2000.*
(Continued)

*Primary Examiner* — Christian P Chace
*Assistant Examiner* — Tsu-Chang Lee
(74) *Attorney, Agent, or Firm* — Steve Wight; Cassandra T. Swain; Micky Minhas

(57) ABSTRACT

An "Interestingness Modeler" uses deep neural networks to learn deep semantic models (DSM) of "interestingness." The DSM, consisting of two branches of deep neural networks or their convolutional versions, identifies and predicts target documents that would interest users reading source documents. The learned model observes, identifies, and detects naturally occurring signals of interestingness in click transitions between source and target documents derived from web browser logs. Interestingness is modeled with deep neural networks that map source-target document pairs to feature vectors in a latent space, trained on document transitions in view of a "context" and optional "focus" of source and target documents. Network parameters are learned to minimize distances between source documents and their corresponding "interesting" targets in that space. The resulting interestingness model has applicable uses, including, but not limited to, contextual entity searches, automatic text highlighting, prefetching documents of likely
(Continued)

interest, automated content recommendation, automated advertisement placement, etc.

19 Claims, 6 Drawing Sheets

(58) Field of Classification Search
USPC .................................................... 706/27, 31
See application file for complete search history.

(56) References Cited

U.S. PATENT DOCUMENTS

| | | | |
|---|---|---|---|
| 8,019,763 B2* | 9/2011 | Wang | G06F 17/30864 |
| | | | 707/738 |
| 8,306,931 B1 | 11/2012 | Bowman et al. | |
| 8,412,648 B2 | 4/2013 | Karypis | |
| 8,429,106 B2 | 4/2013 | Downs et al. | |
| 8,504,583 B1 | 8/2013 | Ke et al. | |
| 8,615,514 B1 | 12/2013 | Fernandes | |
| 8,694,511 B1 | 4/2014 | Corduneanu | |
| 8,775,406 B2 | 7/2014 | Gross | |
| 8,938,463 B1 | 1/2015 | Kim | |
| 9,336,321 B1* | 5/2016 | Hayden | G06F 17/3089 |
| 9,406,077 B1 | 8/2016 | Zhao | |
| 2007/0245035 A1 | 10/2007 | Attaran Rezaei | |
| 2009/0210218 A1* | 8/2009 | Collobert | G06F 17/277 |
| | | | 704/9 |
| 2011/0208768 A1 | 8/2011 | Mehanna | |
| 2011/0213655 A1 | 9/2011 | Henkin | |
| 2011/0252027 A1 | 10/2011 | Chen et al. | |
| 2011/0302117 A1 | 12/2011 | Pinckney et al. | |
| 2012/0137201 A1 | 5/2012 | White et al. | |
| 2012/0253792 A1* | 10/2012 | Bespalov | G06F 17/30707 |
| | | | 704/9 |
| 2012/0254164 A1* | 10/2012 | Ide | G06F 17/30675 |
| | | | 707/723 |
| 2013/0036191 A1 | 2/2013 | Fink | |
| 2013/0138589 A1 | 5/2013 | Yu et al. | |
| 2013/0204833 A1 | 8/2013 | Pang et al. | |
| 2013/0346182 A1 | 10/2013 | Cheng | |
| 2014/0006951 A1* | 1/2014 | Hunter | H04H 60/31 |
| | | | 715/719 |
| 2014/0019443 A1 | 1/2014 | Golshan | |
| 2014/0025382 A1* | 1/2014 | Chen | G10L 13/02 |
| | | | 704/260 |
| 2014/0236943 A1 | 8/2014 | Li | |

OTHER PUBLICATIONS

Bespalov, et al., "Sentiment Classification Based on Supervised Latent n-gram Analysis", Proceedings of the 20th ACM International Conference on Information and Knowledge Management, 2011.*
"International Search Report and Written Opinion Issued in PCT Application No. PCT/US2015/034994", dated Sep. 11, 2015, 10 Pages.
Chen, et al. "Deep Learning with Hierarchical Convolutional Factor Analysis", in Proceedings of the Transactions on Pattern Analysis and Machine Intelligence, vol. 35, No. 8, Aug. 1, 2013, 15 Pages.
Chen, et al., "Semantic Smoothing and Fabrication of Phrase Pairs for SMT", in Proceedings of the International Workshop on Spoken Lanuage Translation, Dec. 8, 2011, 7 pages.
Piwowarski, et al., "Predictive User Click Models Based on Clickthrough History", in Proceedings of the sixteenth ACM conference on Conference on information and knowledge management, Nov. 6, 2007, 9 pages.
Xu, et al., "Semantics-Based Personalized Prefetching to Improve Web Performance", in Proceedings of Conference on Distributed Computing Systems, Apr. 2000, 21 pages.
Singer, et al., "Memory and Structure in Human Navigation Patterns", in Proceedings of the Computing Research Repository, Feb. 2014, 27 pages.

Agichtein, et al., "Improving Web Search Ranking by Incorporating User Behavior Information", in Proceedings of the 29th Annual International ACM SIGIR Conference on Research and Development in Information Retrieval, Aug. 6, 2006, 8 pages.
Bandari, et al., "The Pulse of News in Social Media: Forecasting Popularity", in 6th International Conference on Weblogs and Social Media, Jun. 4, 2012, 8 pages.
Bengio, Yoshua, "Learning Deep Architectures for AI", in Journal Foundations and Trends® in Machine Learning, vol. 2, Issue 1, Jan. 2009, 130 pages.
Berger, et al., "Information Retrieval as Statistical Translation", in Proceedings of 22nd Annual International ACM SIGIR Conference on Research and Development in Information Retrieval, Aug. 15, 1999, pp. 222-229.
Blei, et al., "Latent Dirichlet Allocation", in Journal of Machine Learning Research, vol. 3, Mar. 1, 2003, 30 pages.
Broder, et al., "A Semantic Approach to Contextual Advertising", in Proceedings of the 30th Annual International ACM SIGIR Conference on Research and Development in Information Retrieval, Jul. 23, 2007, pp. 559-566.
Brown, et al., "The Mathematics of Statistical Machine Translation: Parameter Estimation", in Journal of Computational Linguistics, vol. 19, Issue 2, Jun. 1993, 50 pages.
Burges, et al., "Learning to Rank Using Gradient Descent", in Proceedings of 22nd International Conference on Machine Learning, Aug. 7, 2005, pp. 89-96.
Chatterjee, et al., "Modeling the Clickstream: Implications for Web-Based Advertising Efforts", in Journal of Marketing Science, vol. 22, Issue 4, Oct. 15, 2003, pp. 520-541.
Collobert, et al., "Natural Language Processing (Almost) from Scratch", in Journal of Machine Learning Research, vol. 12, Aug. 2011, 45 pages.
Craswell, et al., "An Experimental Comparison of Click Position-Bias Models", in Proceedings of the International Conference on Web Search and Data Mining, Feb. 11, 2008, 8 pages.
Deerwester, et al., "Indexing by Latent Semantic Analysis", in Journal of the American Society for Information Science, vol. 41, Issue 6, Sep. 1990, pp. 391-407.
Deng, et al., "New Types of Deep Neural Network Learning for Speech Recognition and Related Applications: An Overview", in IEEE International Conference on Acoustics, Speech, and Signal Processing, May 2013, 5 pages.
Deng, et al., "A Deep Convolutional Neural Network Using Heterogeneous Pooling for Trading Acoustic Invariance with Phonetic Confusion", in IEEE International Conference on Acoustics, Speech, and Signal Processing, May 2013, 5 pages.
Dumais, et al., "Automatic Cross-Linguistic Information Retrieval using Latent Semantic Indexing", Published on: Jul. 22, 1996, Available at: http://citeseerx.ist.psu.edu/viewdoc/download?doi=10.1.1.54.5378&rep=rep1&type=pdf.
Friedman, Jerome H., "Greedy Function Approximation: A Gradient Boosting Machine", in Annals of Statistics, vol. 29, Feb. 24, 1999, 39 pages.
Gamon, et al., "Understanding Document Aboutness Step One: Identifying Salient Entities", in Microsoft Research Technical Report MSR-TR-2013-73, Nov. 2013, 21 pages.
Gamon, et al., "Identifying Salient Entities in Web Pages", in Proceedings of 22nd ACM International Conference on Information and Knowledge Management, Oct. 27, 2013, 6 pages.
Gao, et al., "Clickthrough-Based Translation Models for Web Search: From Word Models to Phrase Models", in Proceedings of the 19th ACM International Conference on Information and Knowledge Management, Oct. 26, 2010, pp. 1139-1148.
Gao, et al., "Clickthrough-Based Latent Semantic Models for Web Search", in Proceedings of the 34th International ACM SIGIR Conference on Research and Development in Information Retrieval, Jul. 24, 2011, 10 pages.
Gao, et al., "Smoothing Clickthrough Data for Web Search Ranking", in Proceedings of 32nd International ACM SIGIR Conference on Research and Development in Information Retrieval, Jul. 19, 2009, pp. 355-362.
Graepel, et al., "Web-Scale Bayesian Click-Through Rate Prediction for Sponsored Search Advertising in Microsoft's Bing Search

(56) References Cited

OTHER PUBLICATIONS

Engine", in Proceedings of the 27th International Conference on Machine Learning, Jun. 21, 2010, 8 pages.
Graves, et al., "Speech Recognition with Deep Recurrent Neural Networks", in Proceedings of Neural and Evolutionary Computing, Mar. 22, 2013, 5 pages.
Guo, et al., "Click Chain Model in Web Search", in Proceedings of 18th International Conference on World Wide Web, Apr. 20, 2009, pp. 11-20.
Hinton, et al., "Deep Neural Networks for Acoustic Modeling in Speech Recognition", in IEEE Signal Processing Magazine, Nov. 2012, pp. 82-97.
Hinton, et al., "Discovering Binary Codes for Documents by Learning Deep Generative Models", in Topics in Cognitive Science, Apr. 7, 2014, 18 pages.
Hofmann, Thomas, "Probabilistic Latent Semantic Indexing", in Proceedings of 22nd Annual International ACM SIGIR Conference on Research and Development in Information Retrieval, Aug. 15, 1998, 8 pages.
Huang, et al., "Learning Deep Structured Semantic Models for Web Search using Clickthrough Data", in Proceedings of 22nd ACM International Conference on Information & Knowledge Management, Oct. 27, 2013, 6 pages.
Jarvelin, et al., "IR Evaluation Methods for Retrieving Highly Relevant Documents", in Proceedings of the 23rd Annual International ACM SIGIR Conference on Research and Development in Information Retrieval, Jul. 24, 2000, pp. 41-48.
Joachims, Thorsten, "Optimizing Search Engines using Clickthrough Data", in Proceedings of the Eighth ACM SIGKDD International Conference on Knowledge Discovery and Data Mining, Jul. 23, 2002, 10 pages.
Krizhevsky, et al., "ImageNet Classification with Deep Convolutional Neural Networks", in Advances in Neural Information Processing Systems, Dec. 3, 2012, 9 pages.
Lerman, et al., "Using a Model of Social Dynamics to Predict Popularity of News", in 19th International Conference on World Wide Web, Apr. 26, 2010, 11 pages.
Mikolov, et al., "Recurrent Neural Network Based Language Model", in Proceedings of 11th Annual Conference of the International Speech Communication Association, Sep. 26, 2010, 4 pages.
Paranjpe, Deepa, "Learning Document Aboutness from Implicit User Feedback and Document Structure", in Proceedings of the 18th ACM Conference on Information and Knowledge Management, Novmeber 2, 2009, pp. 365-374.
Platt, et al., "Translingual Document Representations from Discriminative Projections", in Proceedings of Empirical Methods in Natural Language Processing, Oct. 9, 2010, 11 pages.
Robertson, et al., "The Probabilistic Relevance Framework: BM25 and Beyond", in Journal Foundations and Trends in Information Retrieval, vol. 3, Issue 4, Apr. 2009, 59 pages.
Shen, et al., "Personalized Click Model Through Collaborative Filtering", in Proceedings of the Fifth ACM International Conference on Web Search and Data Mining, Feb. 8, 2012, 10 pages.
Socher, et al., "Semantic Compositionality through Recursive Matrix-Vector Spaces", Semantic Compositionality through Recursive Matrix-Vector Spaces, Jul. 12, 2012, 11 pages.
Szabo, et al., "Predicting the Popularity of Online Content", in Proceedings of the ACM of Magazine Communication, vol. 53, Issue 8, Aug. 1, 2010, 10 pages.
Wu, et al., "Adapting Boosting for Information Retrieval Measures", in Journal of Information Retrieval, vol. 13, No. 3, Jun. 23, 2011, 17 pages.
Yih, et al., "Learning Discriminative Projections for Text Similarity Measures", in Proceedings of 15th Conference on Computational Natural Language Learning, Jun. 23, 2011, 10 pages.
Kim, David H., U.S. Office Action, U.S. Appl. No. 14/168,936, dated Jan. 20, 2017, pp. 1-13.
"International Preliminary Report on Patentability Issued in PCT Application No. PCT/US2015/034994", dated Sep. 21, 2016, 6 Pages.

Bao, et al., "Optimizing Web Search using Social Annotations", in Proceedings of the 16th International Conference on World Wide Web, May 8, 2007, 10 pages.
Bilenko, et al., "Mining the Search Trails of Surfing Crowds: Identifying Relevant Websites from user Activity", in Proceedings of 17th International World Wide Web Conference, Apr. 21, 2008, 10 pages.
Buscher, et al., "Segment-Level Display Time as Implicit Feedback: A Comparison to Eye Tracking", in Proceedings of the 32nd International ACM SIGIR Conference on Research and Development in Information Retrieval, Jul. 19, 2009, 8 pages.
Chang, et al., "Connections between the Lines: Augmenting Social Networks with Text", in Proceedings of the 15th ACM SIGKDD International Conference on Knowledge Discovery and Data Mining, Jun. 28, 2009, 9 pages.
Chakrabarti, et al., "Contextual Advertising by Combining Relevance with Click Feedback", in 17th International Conference on World Wide Web, Apr. 21, 2008, 10 pages.
Chen, et al., "Leveraging Multi-Domain Prior Knowledge in Topic Models", in Proceedings of the Twenty-Third International Joint Conference on Artificial Intelligence, Aug. 3, 2013, 7 pages.
Chen, et al., "Position-Normalized Click Prediction in Search Advertising", in Proceedings of the 18th ACM SIGKDD International Conference on Knowledge Discovery and Data Mining, Aug. 12, 2012, 9 pages.
Cheng, et al., "Personalized Click Prediction in Sponsored Search", in Proceedings of the Third ACM International Conference on Web Search and Data Mining, Feb. 4, 2010, 9 pages.
Cheng, et al., "Multimedia Features for Click Prediction of New Ads in Display Advertising", in Proceedings of the 18th ACM SIGKDD International Conference on Knowledge Discovery and Data Mining, Aug. 12, 2012, 9 pages.
Dhillon, et al., "Concept Decompositions for Large Sparse Text Data Using Clustering", in Journal of Machine Learning, vol. 42, Issue 1-2, Jan. 2001, 31 pages.
Erosheva, et al., "Mixed Membership Models of Scientific Publications", in Proceedings of the National Academy of Sciences of the United States of America, vol. 101, Apr. 6, 2004, 13 pages.
Evans, et al., "An Elaborated Model of Social Search", in Journal of Information Processing and Management, vol. 46, Issue 6, Nov. 2010, 23 pages.
Farahat, et al., "How Effective is Targeted Advertising?", in Proceedings of the 21st International Conference on World Wide Web, Apr. 16, 2012, 10 pages.
Ghosh, et al., "Externalities in Online Advertising", in Proceedings of 17th International Conference on World Wide Web, Apr. 21, 2008, 8 pages.
Granka, et al., "Eye-Tracking Analysis of User Behavior in WWW Search", in Proceedings of the 27th Annual International ACM SIGIR Conference on Research and Development in Information Retrieval, Jul. 25, 2004, 3 pages.
Griffiths, et al., "Finding Scientific Topics", in Proceedings of the National Academy of Sciences of the United States of America, vol. 101, Apr. 6, 2004, 8 pages.
Guo, et al., "Beyond Dwell Time: Estimating Document Relevance from Cursor Movements and other Post-click Searcher Behavior", in Proceedings of the 21st International Conference on World Wide Web, Apr. 16, 2012, 10 pages.
Guo, et al., "Named Entity Recognition in Query", in Proceedings of the 32nd International ACM SIGIR Conference on Research and Development in Information Retrieval, Jul. 19, 2009, 8 pages.
Hillard, et al., "The Sum of its Parts: Reducing Sparsity in Click Estimation with Query Segments", in Journal of Information Retrieval, vol. 14, Issue 3, Jun. 2011, 30 pages.
Huang, et al., "Clustering Documents Using a Wikipedia-Based Concept Representation", in Proceedings of the 13th Pacific-Asia Conference on Advances in Knowledge Discovery and Data Mining, Apr. 27, 2009, 8 pages.
Jin, et al., "A Unified Approach to Personalization Based on Probabilistic Latent Semantic Models of Web Usage and Content", in Proceedings of the AAAI Workshop on Semantic Web Personalization, Jul. 25, 2004, 9 pages.

(56) References Cited

OTHER PUBLICATIONS

Joachims, et al., "Accurately Interpreting Clickthrough Data as Implicit Feedback", in Proceedings of the 28th Annual International ACM SIGIR Conference on Research and Development in Information Retrieval, Aug. 15, 2005, 8 pages.

Kelly, et al., "Display Time as Implicit Feedback: Understanding Task Effects", in Proceedings of the 27th Annual International ACM SIGIR Conference on Research and Development in Information Retrieval, Jul. 25, 2004, 8 pages.

Lacerda, et al., "Learning to Advertise", in Proceedings of the 29th Annual International ACM SIGIR Conference on Research and Development in Information Retrieval, Aug. 6, 2006, 8 pages.

Lin, et al., "Active Objects: Actions for Entity-Centric Search", in Proceedings of 21st International Conference on World Wide Web, Apr. 16, 2012, 10 pages.

Maedche, et al., "Mining Ontologies from Text", in Proceedings of the 12th European Workshop on Knowledge Acquisition, Modeling and Management, Oct. 2, 2000, 14 pages.

Meteren, et al., "Using Content-Based Filtering for Recommendation", in Proceeding of Workshop on Machine Learning and New Information Age, May 30, 2000, 10 pages.

McKeown, et al., "Tracking and Summarizing News on a Daily Basis with Columbia's Newsblaster", in Proceedings of the Second International Conference on Human Language Technology Research, Mar. 24, 2002, 6 pages.

McMahan, et al., "Ad Click Prediction: A View from the Trenches", in Proceedings of the 19th ACM SIGKDD International Conference on Knowledge Discovery and Data Mining, Aug. 11, 2013, 9 pages.

Metzler, et al., "Latent Concept Expansion using Markov Random Fields", in Proceedings of the 30th Annual International ACM SIGIR Conference on Research and Development in Information Retrieval, Jul. 23, 2007, 8 pages.

Morita, et al., "Information Filtering Based on User Behavior Analysis and Best Match Text Retrieval", in Proceedings of the 17th Annual International ACM SIGIR Conference on Research and Development in Information Retrieval, Aug. 1, 1994, 10 pages.

Okumura, et al., "Lexicon-to-Ontology Concept Association using a Bilingual Dictionary", in Proceedings of the First Conference of the Association for Machine Translation in the Americans, Oct. 1994, 8 pages.

Ramage, et al., "Clustering the Tagged Web", in Proceedings of the Second ACM International Conference on Web Search and Data Mining, Feb. 9, 2009, 10 pages.

Richardson, et al., "Predicting Clicks: Estimating the Click-Through Rate for New Ads", in Proceedings of the 16th International Conference on World Wide Web, May 8, 2007, 9 pages.

Sanderson, et al., "Deriving Concept Hierarchies from Text", in Proceedings of the 22nd Annual International ACM SIGIR Conference on Research and Development in Information Retrieval, Aug. 15, 1999, 8 pages.

Wang, et al., "A Search-Based Method for Forecasting Ad Impression in Contextual Advertising", in Proceedings of 18th International Conference on World Wide Web, Apr. 20, 2009, 10 pages.

Wang, et al., "Joint Relevance and Freshness Learning from Clickthroughs for News Search", in Proceedings of 21st International Conference on World Wide Web, Apr. 16, 2012, 10 pages.

White, et al., "A Study on the Effects of Personalization and Task Information on Implicit Feedback Performance", in Proceedings of the 15th ACM International Conference on Information and Knowledge Management, Nov. 5, 2006, 10 pages.

Xiong, et al., "Relational Click Prediction for Sponsored Search", in Proceedings of the Fifth ACM International Conference on Web Search and Data Mining, Feb. 8, 2012, 10 pages.

Xu, et al., "Incorporating Revisiting Behaviors into Click Models", in Proceedings of the Fifth ACM International Conference on Web Search and Data Mining, Feb. 8, 2012, 9 pages.

Xu, et al., "Predicting Advertiser Bidding Behaviors in Sponsored Search by Rationality Modeling", in Proceedings of 22nd International Conference on World Wide Web, May 13, 2013, 11 pages.

Xu, et al., "Temporal Click Model for Sponsored Search", in Proceedings of the 33rd International ACM SIGIR Conference on Research and Development in Information Retrieval, Jul. 19, 2010, 8 pages.

Yano, et al., "Predicting Response to Political Blog Posts with Topic Models", in Proceedings of the Annual Conference of the North American Chapter of the Association for Computational Linguistics, May 31, 2009, 9 pages.

"Second Written Opinion Issued in PCT Application No. PCT/US2015/034994", dated May 24, 2016, 5 Pages.

Riccie, Francesco et al. Recommender Systems Handbook, 2010, Springer, 847 pages.

Hill, Stanley K., U.S. Final Office Action, U.S. Appl. No. 14/168,936, dated Sep. 25, 2017, pp. 1-13.

\* cited by examiner

MODELING INTERESTINGNESS WITH DEEP NEURAL NETWORKS

BACKGROUND

There are many systems that identify popular content in the Web or recommend popular content. Such systems are often based on determining or evaluating factors that include when, where, and how many users are viewing or interacting with particular content over some period of time. Similar issues are addressed by various click prediction systems that evaluate web usage information in an attempt to compute the probability that a given document, or an advertisement, in a search-result page is clicked on after a user enters some query. Further, the click models used for click prediction are sometimes personalized to particular users to enable the use of a user-specific click through rate (CTR).

Information retrieval has been address using various techniques. For example, Latent Semantic Analysis (LSA) provides a semantic model designed for various information retrieval (IR) based tasks. Examples of generative topic models used for IR include probabilistic LSA, Latent Dirichlet Allocation (LDA), etc. In addition, some of these models have been extended to handle cross-lingual cases to retrieve information from pairs of corresponding documents in different languages.

Various deep learning techniques have been used to evaluate training data to discover hidden structures and associated features at different levels of abstraction for a variety of tasks. For example, some of these techniques use deep neural networks or other deep learning techniques to discover hierarchical semantic structures embedded in queries and documents.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, an "Interestingness Modeler," as described herein, considers a notion of "interestingness" that represents a conditional likelihood of a user being interested in viewing or transitioning to a target document (e.g., images with captions, text, documents, web pages, spreadsheets, mixtures of different types of content, etc.) when reading or viewing a source document in view of a "context" and optional "focus" of the source and target document. The Interestingness Modeler provides various techniques for constructing and using deep neural networks to learn deep semantic models (DSM) of interestingness. Naturally occurring interest signals for training are obtained by observing click transitions between source and target documents derived from web browser logs. The learned DSM is then used to identify target documents that would likely interest a user when reading or viewing a source document.

More specifically, interestingness is modeled with deep neural networks that map source-target document pairs to feature vectors in a latent space, trained on large numbers of observed document transitions. Network parameters are learned to minimize the distance between source documents and their corresponding interesting targets in the latent space. The resulting interestingness model is applicable for a wide range of uses, including, but not limited to contextual entity searches, automatic text highlighting, prefetching documents likely to be of interest to the user, automated document recommendation, automated advertisement placement, etc.

In various implementations, the Interestingness Modeler begins operation by receiving a collection of source and target document pairs. The Interestingness Modeler then identifies a context for each source document and further identifies a context for each target document. Each of these contexts is then mapped to a separate vector. Each vector is then mapped to a convolutional layer of a deep neural network or the like. This convolutional layer is in turn mapped to a plurality of hidden layers of the neural network. Once these mapping steps have been completed, the Interestingness Modeler generates an interestingness model by learning weights for each of the multiple transitions between the layers of the neural network, such that the learned weights minimize a distance between the vectors of interesting source and target documents.

Further, in various implementations, the Interestingness Modeler provides an enhanced DSM by further identifying a focus for each source document and each target document. Note that the focus represents a different text span in each document that is likely to have a high degree of relevance. These identified foci are used in combination with the contexts of the corresponding source and target documents to construct the corresponding vectors. In particular, in implementations where a focus is identified for source and target documents, both the focus and context of each document is mapped to the same corresponding vector for each document.

In view of the above summary, it is clear that the Interestingness Modeler described herein provides various techniques for constructing and using deep neural networks to learn a DSM of "interestingness" that is used to identify and predict target documents that would interest a user when reading or viewing a source document. In addition to the just described benefits, other advantages of the Interestingness Modeler will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE IMPLEMENTATIONS

Figure 1:
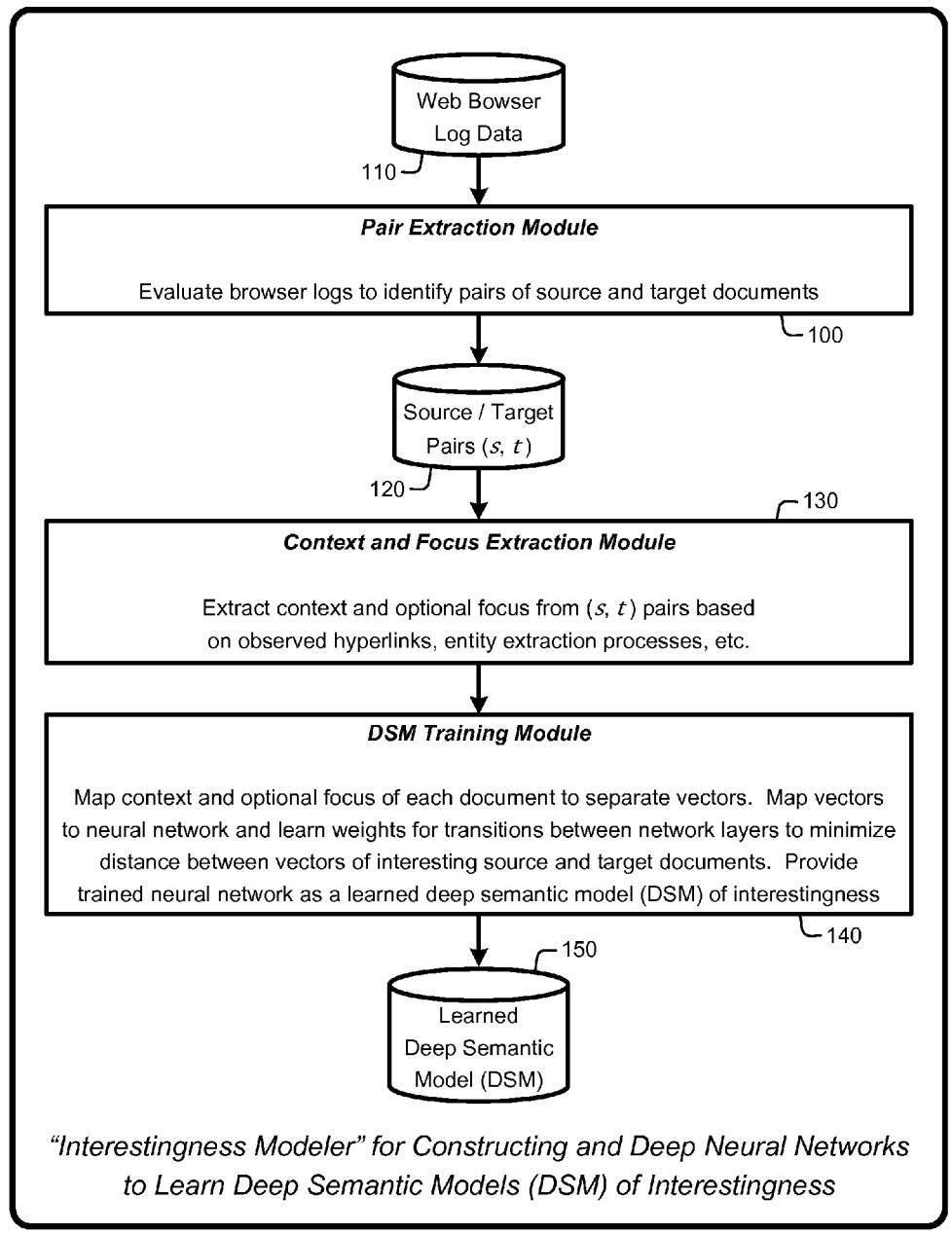
FIG. 1 provides an exemplary architectural flow diagram that illustrates program modules of an "Interestingness Modeler" for learning a deep semantic model (DSM) of interestingness, as described herein.

In the following description of the implementations of the claimed subject matter, reference is made to the accompanying drawings, which form a part hereof, and in which is shown by way of illustration specific implementations in which the claimed subject matter may be practiced. It should be understood that other implementations may be utilized and structural changes may be made without departing from the scope of the presently claimed subject matter.

1.0 Introduction:

In general, an "Interestingness Modeler," as described herein, considers a notion of "interestingness" that represents a conditional likelihood of a user being interested in viewing or transitioning to a target document (e.g., images with captions, text, documents, web pages, spreadsheets, etc.) when reading or viewing a source document in view of a "context" and optional "focus" of the source and target documents. The Interestingness Modeler provides various techniques for constructing and using deep neural networks to learn deep semantic models (DSM) of "interestingness."

Naturally occurring interest signals for training are obtained by observing click transitions between source and target documents derived from web browser logs. The learned DSM is then used to identify target documents that would likely interest a user when reading or viewing a source document.

More specifically, interestingness is modeled with deep neural networks that map source-target document pairs to feature vectors in a latent space. The DSM is trained on large numbers of naturally occurring interest signals that are obtained by observing click transitions between source and target documents derived from web browser logs. Network parameters of the DSM are learned to minimize the distance between source documents and their corresponding interesting targets in the latent space.

The resulting interestingness model is applicable for a wide range of uses, including, but not limited to contextual entity searches, automatic text highlighting, prefetching documents likely to be of interest to the user, automated document recommendation, automated advertisement placement, etc.

For example, consider contextual entity searches. In various implementations, when a user highlights a text span (e.g., word, phrase, sentence, paragraph, etc.) in a document that represents an entity of interest to her when reading a document (e.g., a person, location, organization, etc.), the Interestingness Modeler assists the user by automatically searching the Web for supplementary information about that entity that is likely to be if interest to the user. This task is challenging because the same text span often refers to different entities, and interesting supplementary information to the highlighted text span is highly sensitive to the semantic context. For example, the entity "Paul Simon" can refer to many people, such as the singer or the U.S. Senator. Consider an article about the music of the singer Paul Simon and another about his life. Related content about his upcoming concert tour is likely to be more interesting in the first context, while an article about his family is likely to be more interesting in the second.

In contrast to contextual entity searches, where the text span is highlighted by the user, in various implementations, the Interestingness Modeler automatically highlights text in arbitrary content that is likely to be of interest to the user. More specifically, in various implementations, the Interestingness Modeler automatically discovers concepts, entities and topics likely to be interest the reader, and then highlights or otherwise augments (e.g., add hyperlinks, import interesting content, etc.) the corresponding text spans. Similar to the task of contextual entity searches, document semantics are considered to determine what is likely to be interesting to the user. For example, when a user reads an article about a movie, she is more likely to be interested in browsing or transitioning to an article about an actor or character in that movie than to another movie or the director.

When used to enable various prefetching type implementations, the Interestingness Modeler evaluates the content being currently consumed by the user to predict what the user will be interested in next. This allows the Interestingness Modeler to prefetch, download, or otherwise retrieve corresponding content before the user attempts to access that content, thus increasing rendering performance for a wide range of applications, such as a contextual entity search system. This proactive content selection and prefetching decision is made without requiring user input, such as choosing from a set of recommendations or search results, and allows the user to immediately access content that is likely to be of interest rather than waiting for document download after clicking on a hyperlink or the like.

In various implementations, tasks and implementations such as those summarized above are combined into a unified framework that makes document reading a more productive and interactive experience. For example, in various implementations, the Interestingness Modeler provides a document rendering process that pre-highlights for the user what might be of interest in her current context (e.g., highlighting). She is then free to interact with these highlights or select any other text span of interest, for which the Interestingness Modeler automatically retrieves interesting supplementary content (e.g., contextual entity search). Behind the scenes, the Interestingness Modeler would prefetch related content for a subset of the predicted interesting content to speed up the rendering and retrieval process (e.g., document prefetching) in the event that the user subsequently selects the prefetched content.

1.1 Definitions and General Considerations

The concept of "content" or "documents" being "consumed" by the user is defined as any content or document (e.g., images with captions, text, documents, web pages, spreadsheets, mixtures of different types of content, etc.) that includes at least some text-based content in any document that is being read, viewed, or otherwise accessed by the user. In general, such content is meant in its most general form as including one or more strings of raw unstructured text. In other words, the interestingness function (see Equation (1) below) is not required to rely on any document structure such as title tags, hyperlinks, XML data, etc., or on Web interaction data. As such, documents can be formed from the plain text of a webpage, as a text span in plain text, from the caption of an image, from text documents, from content containing mixtures of text and images or other content such as audio, etc., as discussed in further detail herein.

The "context" in the source document is defined either as an anchor (e.g., a hyperlink or the like) or as a selected word or word string, in combination with a relatively large window of words around the anchor or selected words. For example, in a tested implementation, a window size, j, covering a total of 200 words before and after the anchor or selected words was used to define the context (e.g., 100 words before and 100 words after). In contrast, the context in the target document is simply the first k words in the target, where k can be any desired value. Note that in various tested implementations, the sizes of j and k were both set to a value of 200 words, though there is no requirement for these values to be the same.

The "focus" in the source document is typically a much smaller portion of text than then context of the document. For example, the focus is defined as either an anchor (e.g., a hyperlink or the like) or a selected word or word string in a document. In contrast, the focus in the target document is set to be some relatively small fixed number of words in the beginning of the target document. For example, in a tested implementation, the first 10 words in the target document was set as the focus. However, it should be understood that a larger or smaller of number of words can be used as the focus of the target document.

The term "interestingness" is defined herein as a computed score or statistical measure relating to the likelihood that the user will be interested in pursuing, consuming, or transitioning to a different document or content, in view of an arbitrary document or other content currently being consumed by the user. In other words, as noted above, the notion of interestingness represents the conditional likelihood of a user being interested in viewing or transitioning to a target document when reading an arbitrary source document in view of the context and optional focus of the source document relative to the target documents.

In general, this notion of interestingness is modeled with a computational deep semantic model. The model is semantic because it maps word representations of documents to feature vectors in a latent semantic space (also known as the semantic representation). The model is deep because it employs a deep neural network to extract hidden semantic features at different levels of abstractions, layer by layer. The semantic representation is computed through the several layers of the neural network after its training by methods including, but not limited to, backpropagation or other supervised learning techniques with respect to an objective tailored to the respective interestingness tasks.

In other words, interestingness is modeled with a deep neural network that maps source-target document pairs to feature vectors in latent semantic space, and is trained using observed browsing transitions between documents. In various implementations, training data including, but not limited to, naturally occurring interest signals is sampled from Web usage logs that are evaluated to extract Web browser transition pairs between source documents and target documents.

In particular, let D be the set of all documents. Then, the interestingness modeling task is formally defined as learning the mapping function:

$$\sigma(s,t): D \times D \rightarrow \mathbb{R}^+ \qquad \text{Equation (1)}$$

where the function $\sigma(s,t)$ is the quantified degree of interest that the user has in the target document $t \in D$ after or while reading the source document $s \in D$.

The training data used to learn the DSM can be obtained by observing any of a wide variety of naturally occurring signals or manifestations of interestingness on the Web. For example, on Twitter®, users often follow shared links embedded in tweets, and in Web search, users search for their interests on a search engine.

One of the most frequent signals of interestingness occurs in Web browsing events where users click from one webpage to another via hyperlinks. When a user clicks on a hyperlink, it is reasonable to assume that she is interested in learning more about the anchor, modulo cases of erroneous clicks. Aggregate clicks can therefore serve as a proxy for interestingness. That is, for a given source document s, target documents t that attract the most clicks are likely to be more interesting than documents that attract fewer clicks. More formally, a gold standard interestingness function, σ', can be stated as:

$$\sigma'(s,t) = p(t|s) \qquad \text{Equation (2)}$$

where p(t|s) is the probability of a user clicking through to a target document t when viewing a source document s.

It should be understood that although the click signal is available to form a dataset and gold standard function, the Interestingness Modeler uses this information to model interestingness between arbitrary unstructured documents, for which prior click data may not be available. In other words, once the Interestingness Modeler has learned the DSM, the DSM is applicable to arbitrary documents regardless of whether there is any document structure (e.g., tags, titles, table of contents, hyperlinks, metadata, etc.) or Web interaction data for those arbitrary documents. Consequently, the interestingness models, σ, developed by the Interestingness Modeler are implemented without requiring the use of any document structural information or metadata.

As discussed in further detail herein, in various implementations, the Interestingness Modeler collects a large dataset of user browsing events from browser logs. For example, in a tested implementation, training data was sampled from millions of occurrences of user clicks from one Wikipedia® page to another that were collected during a one-year period. Note that Wikipedia® page browsing events were used for training purposes since these pages tend to contain many anchors (i.e., 79 on average, among which 42 have a unique target URL). However, it should be understood that any set of page transition data can be used for training purposes and that the DSM learned by the Interestingness Modeler is not intended to be limited to the use of training data derived from Wikipedia® pages. Further, once trained, the resulting DSM is applicable to modeling interestingness in arbitrary content regardless of the source of those pages or documents.

Note that some pages contain multiple anchors that point to the same target document (i.e., common links). Consequently, in various implementations, when joining content to transitions for a source page with multiple common links to a particular target, it is assumed that the first of these common links was clicked (i.e., that the click originated from the first anchor). However, other assumptions can be made with respect to which of these common links was clicked in the transition from a source to a target document.

1.2 System Overview

As noted above, the Interestingness Modeler provides various techniques for constructing and using deep neural networks to learn a DSM of interestingness that is used to identify and predict target documents that would interest a user when reading or viewing a source document. The processes summarized above are illustrated by the general system diagrams of FIG. 1, FIG. 2 and FIG. 3. In particular, these system diagrams illustrate various interrelationships between program modules for implementing various implementations of the Interestingness Modeler, as described herein. Furthermore, while these system diagrams illustrate high-level views of various implementations of the Interestingness Modeler, FIG. 1, FIG. 2 and FIG. 3, either alone or in combination, are not intended to provide an exhaustive or complete illustration of every possible implementation of the Interestingness Modeler as described throughout this document.

Figure 2:
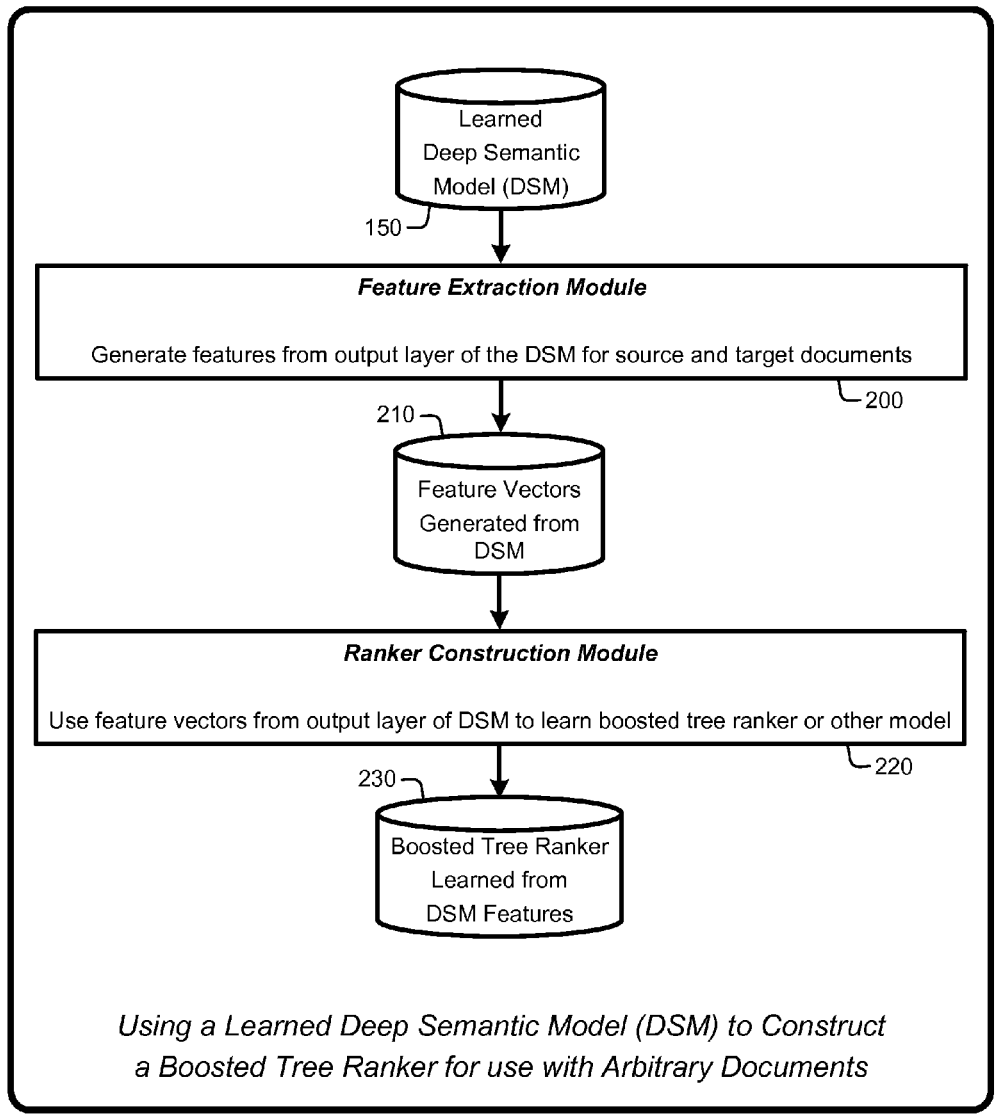
FIG. 2 provides an exemplary architectural flow diagram that illustrates program modules for using a learned DSM to construct a boosted ranker for use with arbitrary documents, as described herein.
Figure 3:
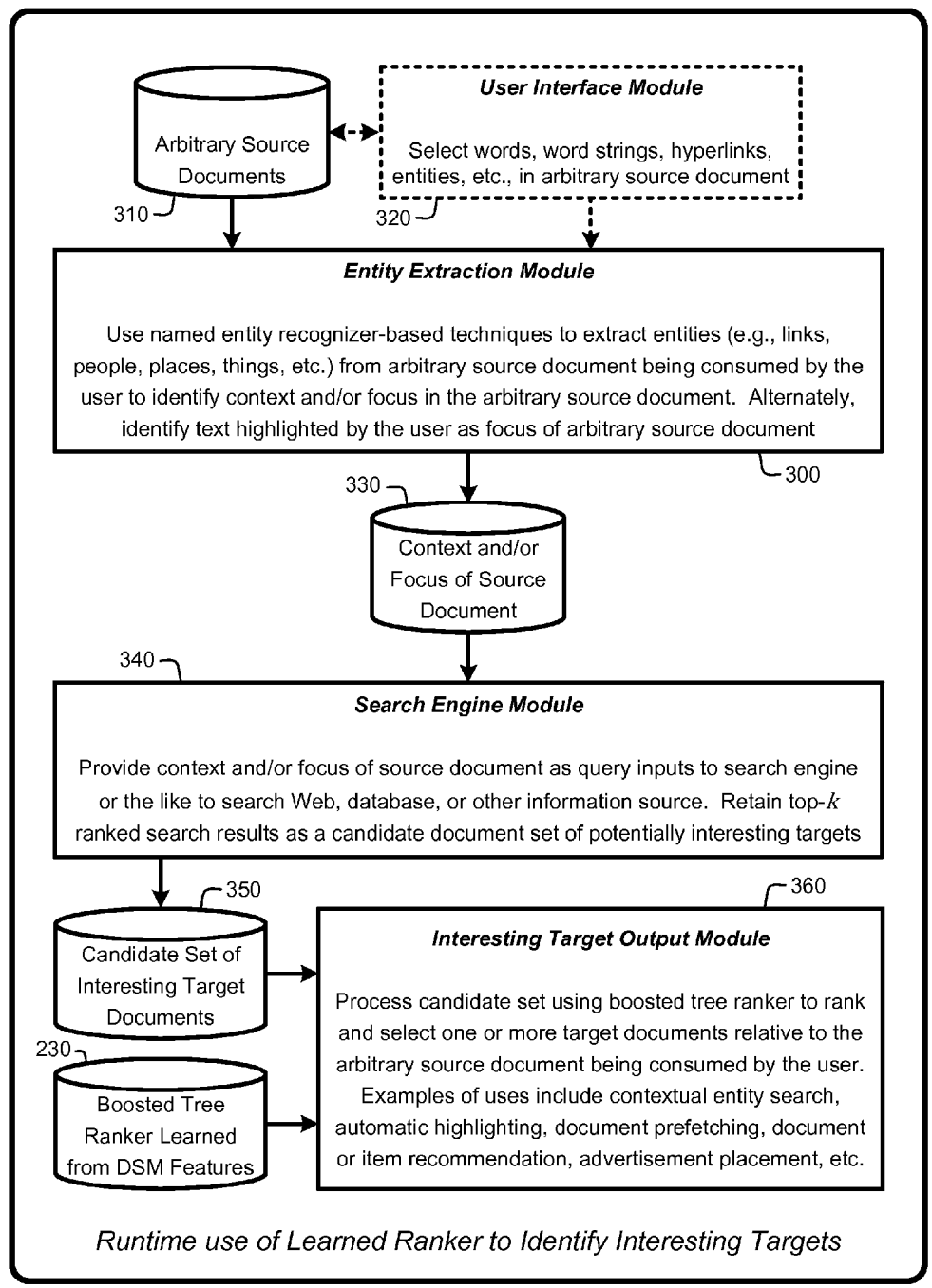
FIG. 3 provides an exemplary architectural flow diagram that illustrates program modules for using a learned boosted ranker to identify interesting targets relative to an arbitrary source document being consumed by a user, as described herein.

In addition, it should be noted that any boxes and interconnections between boxes that may be represented by broken or dashed lines in FIG. 1, FIG. 2, or FIG. 3 represent alternate implementations of the Interestingness Modeler described herein. Further, any or all of these alternate implementations, as described below, may be used in combination with other alternate implementations that are described throughout this document.

In general, as illustrated by FIG. 1, the processes enabled by the Interestingness Modeler for learning the aforementioned DSM begin operation by using Pair Extraction Module 100 to evaluate browser logs 110 to identify a set of source and target document pairs 120 (i.e., (s,t) pairs). A Context and Focus Extraction Module 130 then evaluates the set of source and target document pairs 120 to extract a context and optional focus from the (s,t) pairs based on data such as observed hyperlinks, entity extraction processes, etc.

A DSM Training Module 140 then map context and optional focus of each document to separate vectors. This is done through a neural network, i.e., the context and optional focus are first fed into the input layer of the neural network, then through multiple layer of non-linear transformation (i.e., the neural network), the neuron activation values at the nodes of the last layer of the neural network form the output vector. In turn, these vectors are mapped to a neural network architecture of the DSM. The Interestingness Modeler then learns weights for transitions between network layers to minimize the distance between vectors of interesting source and target documents. Finally, the DSM Training Module 140 provides the trained neural network as a learned deep semantic model (DSM) of interestingness 150 to compute the similarity of interesting documents using the vectors. Note that the neural network for source and target document could be the same or different ones.

As illustrated by FIG. 2, in various implementations, the learned DSM 150 of interestingness is then passed to a Feature Extraction Module 200 that generates feature vectors 210 from the output layer of the DSM for source and target documents. As discussed in further detail herein, a Ranker Construction Module 220 then uses the feature vectors from output layer of the DSM to learn a boosted tree ranker 230 or other model. This boosted tree ranker 230 is then made available for any of a number of interestingness-based tasks.

For example, as illustrated by FIG. 3, in various implementations, an Entity Extraction Module 300 uses any of a variety of named entity recognizer-based techniques to extract entities (e.g., links, people, places, things, etc.) from an arbitrary source document 310 being consumed by the user to identify context and/or focus 330 in that arbitrary source document. Alternately, or in combination, the Interestingness Modeler identifies text highlighted by the via a User Interface Module 320 user as the focus of the arbitrary source document 310. In general, the User Interface Module 320 is used to select words, word strings, hyperlinks, entities, etc., in the arbitrary source document 310.

In either case, once the Entity Extraction Module 300 has identified or extracted the context and/or focus 330 of the arbitrary source document 310, this information is provided to a Search Engine Module 340. The search engine module then uses any conventional search engine or techniques to service the context and/or focus 330 as query inputs to the search engine or the like. The search engine then searches the Web, database, or other information source to return relevant documents.

The Search Engine Module 340 then retains the top-k ranked search results as a candidate set 350 of potentially interesting target documents. An Interesting Target Output Module 360 then processes the candidate set 350 using the previously learned boosted tree ranker 230 to rank and select one or more target documents relative to the arbitrary source document 310 being consumed by the user. As discussed herein examples uses of interesting target documents include, but are not limited to, contextual entity search, automatic highlighting, document prefetching, document or item recommendation, advertisement placement, etc.

2.0 Operational Details of the Interestingness Modeler:

The above-described program modules are employed for implementing various implementations of the Interestingness Modeler. As summarized above, the Interestingness Modeler provides various techniques for constructing and using deep neural networks to learn a DSM of "interestingness" that is used to identify and predict target documents that would interest a user when reading or viewing a source document. The following sections provide a detailed discussion of the operation of various implementations of the Interestingness Modeler, and of exemplary methods for implementing the program modules described in Section 1 with respect to FIG. 1. In particular, the following sections provides examples and operational details of various implementations of the Interestingness Modeler, including:

An operational overview of the Interestingness Modeler;
A deep semantic model (DSM) of Interestingness;
An exemplary loss function for learning the DSM;
Training the DSM;
Using the DSM; and
Additional Implementations and considerations.

2.1 Operational Overview:

As noted above, the processes described herein provide various techniques for constructing and using deep neural networks to learn a DSM of "interestingness" that is used to identify and predict target documents that would interest a user when reading or viewing a source document. Interestingness is modeled with deep neural networks that map source-target document pairs to feature vectors in a latent space, trained on large numbers of document transitions in view of a "context" and optional "focus" of the source and target documents. Neural network parameters are learned to minimize the distance between source documents and their corresponding "interesting" targets in that space. The resulting interestingness model is applicable uses, including, but not limited to, contextual entity searches, automatic text highlighting, prefetching documents likely to be of interest, automated content recommendation, automated advertisement placement, etc.

Figure 4:
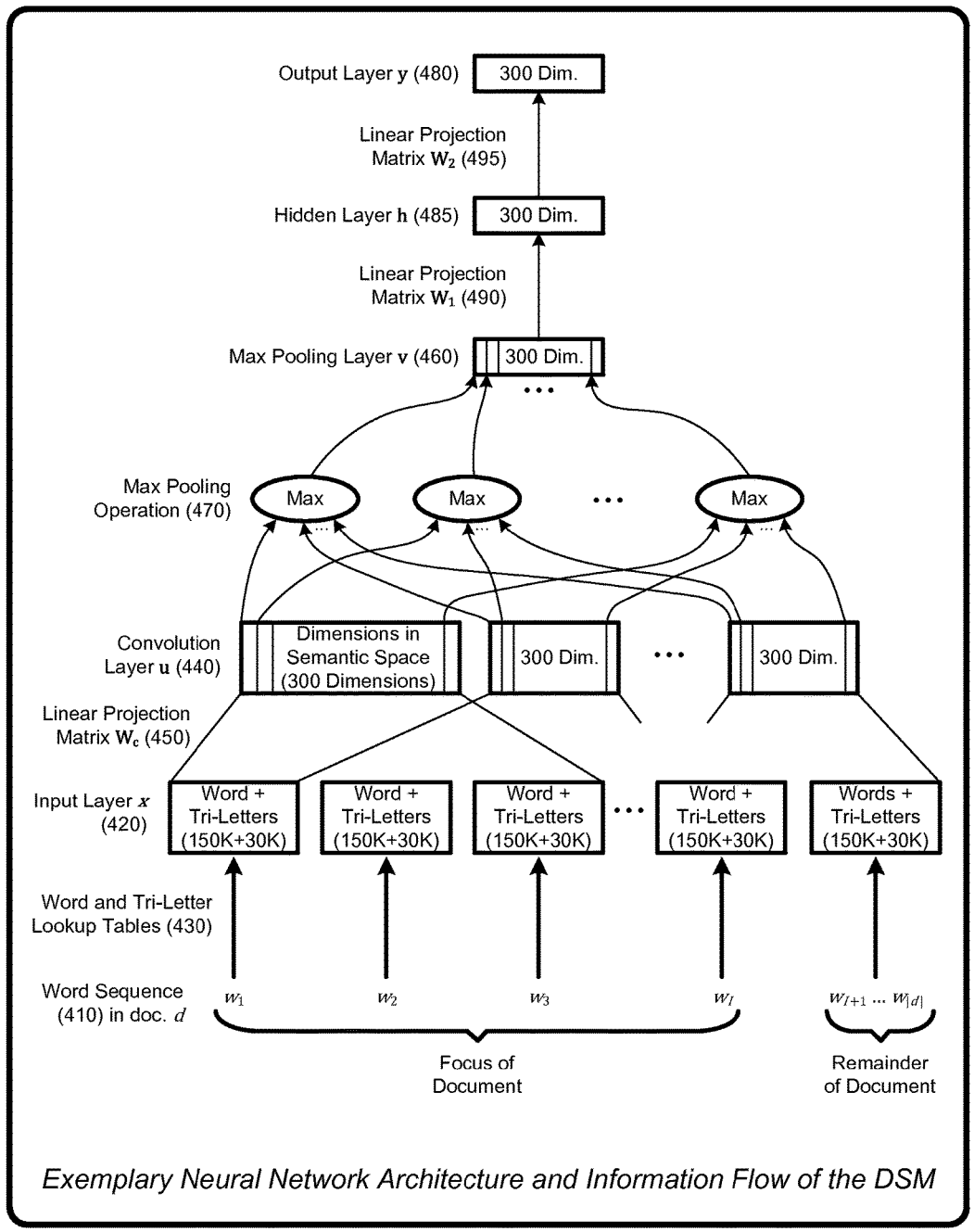
FIG. 4 illustrates an exemplary neural network architecture and information flow of a DSM constructed by the Interestingness Modeler, as described herein.

2.2 A Deep Semantic Model (DSM) of Interestingness:

The Interestingness Modeler provides a DSM derived from a deep neural network with convolutional structure that is highly effective for speech and image tasks. One example of the neural network architecture used to learn the DSM is shown in FIG. 4, as discussed in detail below. Note that the following discussion uses lower-case bold letters, such as x, to denote column vectors, and upper-case letters, such as W, to denote matrices.

Note that the model can be trained (and used) without a particular "focus" by considering the larger "context" of documents. In such cases, rather than use a particular selection or hyperlink as the focus (as defined above), the larger context (as defined above) is used in place of the focus. Consequently, while the following discussion refers to the use of a focus for model training, that discussion applies equally to the use of the larger document context for model training by simply substituting the context for the focus. Further, once learned, the resulting DSM can be used with or without a particular focus by considering either or both the context and focus of the documents being consumed by the user. However, model performance has been observed to improve with the use of both a context and focus for DSM training and use.

2.2.1 Input Layer x:

A document d, which is a sequence of words, is converted into a vector representation x for the input layer of the network. The Interestingness Modeler is capable of adapting techniques, including, but not limited to, bag-of-words based methods for such purposes. However, these types of methods generally result in sparse vectors having a relatively high dimensionality (due to the large vocabularies in many Web applications). This makes the neural network training computationally expensive. Further, some useful contextual information, such as word order and inter-word dependencies, are not preserved with bag-of-words based method and similar techniques.

Consequently, in various implementations, the Interestingness Modeler provides vector-based techniques that both increase the density (i.e., reduces the sparsity) of the vector (thus reducing computational overhead for neural network training) and preserves document contextual information (thus improving DSM model performance). In particular, in various implementations, the Interestingness Modeler implements a two stage approach to build document vectors of the input layer x:

(1) Convert each word in document d (having a total of |d'| words) to a word vector; and
(2) Build the input layer x from these word vectors.

To convert a word w into a word vector, the Interestingness Modeler first represents each word w in document d by a one-hot vector (or the equivalent) using a vocabulary containing N high-frequency words. Note that in a tested English language based implementation of the Interestingness Modeler, a value of N=150K words was used, with N representing the 150K most common words or character sequences in the English language and in the training corpus. Such character sequences may also include misspelled words. Note that with a one-hot vector, a vector of length 150K will have a single non-zero entry corresponding to a particular word in the document. A predefined lookup table or the like of the high-frequency words is used to construct the one-hot vector for each word. Clearly, other languages, dialects, or word sets, may use different numbers or sets of high-frequency words for training purposes.

Next, the Interestingness Modeler also maps each word w to a separate tri-letter vector. For example, consider the word "#dog#", where # is a word boundary symbol (e.g., space, period, exclamation, etc.). As such, the nonzero elements in the tri-letter vector of "#dog#" are "#do", "dog", and "og#". Note that smaller or larger letter vectors may be used for training (e.g., dual-letter vectors, quad-letter vectors, etc.).

However, tri-letter vectors were observed to provide acceptable results in the DSM that resulted from training of the neural network. In a tested implementation, the Interestingness Modeler restricted the use of tri-letters to the most frequent 30K tri-letters (i.e., a vector of length 30K with separate non-zero entries for each tri-letter of the word w) though more or fewer can be used. A predefined lookup table or the like of the allowable tri-letters is then used to construct the tri-letter vector for each word.

The Interestingness Modeler then forms the word vector of w for each word by concatenating its one-hot vector and its tri-letter vector. It should be noted that that the tri-letter vector complements the one-hot vector representation in two aspects. First, different out of vocabulary (OOV) words (i.e., one-hot vector will have all zero entries) will still be represented by tri-letter vectors with few collisions. Second, spelling variations (also including incorrect spellings) of the same word will inherently be mapped to points that are close to each other in the tri-letter space. Further, although the number of unique English words on the Web is extremely large, the total number of distinct tri-letters in English is relatively limited. As a result, incorporating tri-letter vectors into the one-hot vectors substantially improves the representation power of word vectors while keeping their size relatively small.

Then, to form the neural network input layer x using the word vectors, the Interestingness Modeler first identifies a text span in the document d with a high degree of relevance using task-specific heuristics (see Section 2.4). This text span is referred to herein as the "focus" of document d. For example, in the contextual entity search task, the focus in an arbitrary source document is some text span highlighted by a user. Note that such highlighting can be performed manually such as user selection via some pointing device, voice command, etc., or can be performed by automatically tracking the user's eyes to identify a text span being viewed by the user. In contrast, the focus of arbitrary target documents was set to some fixed number, I, of words at the beginning of the target document. For example, in a tested implementation, I was set to be the first 10 words of the document, though any desired number of words can be used for this purpose.

Finally, the neural network input layer x is formed by concatenating each word vector in the focus and a separate vector that is the summation of all the other word vectors in the document not in the focus. Note that the neural network diagram of FIG. 4 illustrates the word sequence (410) of document d being used to construct corresponding separate vectors of the input layer (420) by separately passing each word of the document focus through word and tri-letter lookup tables (430). Similarly, the words in the remainder of the document (i.e., the words outside of the focus) are used to construct a single vector, as noted above. Note that the length of the focus (i.e., number of words) of the source document is typically much smaller than the total length of the source document (unless the user highlights most or all of the document). Consequently, the input layer x is able to capture the contextual information (for the words in the focus) useful to the corresponding tasks, with a manageable vector size. Note that the additional layers of the neural network illustrated in FIG. 4 are discussed in further detail below.

2.2.2 Convolutional Layer u:

As illustrated in FIG. 4, a convolutional layer u (440) of the neural network extracts local features around each word $w_i$ in a word sequence (i.e., the focus in d) of length I as follows. In constructing the convolutional layer u (440), theInterestingness Modeler first generates a contextual vector $c_i$ by concatenating each word vector of $w_i$ and its immediately surrounding words defined by a small window (e.g., a window size of 3 was used in a tested implementation, however, any desired window size can be used). Then, for the contextual vector $c_i$ of each word in the focus, the Interestingness Modeler generates a local feature vector $u_i$ using a tan h activation function and a linear projection matrix $W_c$ (450), which is the same across all windows i in the word sequence, as:

$$u_i = \tan h(W_c^T c_i), \text{ where } i=1, \ldots, I \qquad \text{Equation (3)}$$

Note that as illustrated by FIG. 4, the exemplary neural network shows the use of 300 dimensions in a semantic space of the documents (i.e., K=300 semantic features or topics). However, it should be understood that the use of 300 dimensions is a simple design choice used for testing purposes and that any number of semantic features or topics can be used here. This dimensionality follows through to each of the subsequent layers of the neural network (as illustrated by the use of 300 dimensions in each layer), though networks having different dimensionality at each layer can be implemented, if desired.

Note that increasing the number of dimensions will typically increase model complexity, resulting in longer training times. However, since model training is performed offline, with the resulting DSM being provided for use by individual users, search systems, recommendation systems, advertisement placement systems, etc., the computational overhead in model training is not of significant concern.

2.2.3 Max-Pooling Layer v:

As illustrated in FIG. 4, the neural network includes a max-pooling layer v (460). The design of the max-pooling layer in deep neural networks with convolutional structure directly affects the performance for speech and image tasks. In general, the size of the convolutional layer u (440) depends on the number of words in the word sequence that forms the focus. Local feature vectors are combined to obtain a global feature vector represented by max-pooling layer v (460), with a fixed size independent of the focus length, in order to apply subsequent standard affine layers. The max-pooling layer v (460) is designed by adopting a max pooling operation (470) over each "time" i of the sequence of vectors computed by Equation (3), which forces the network to retain only the most useful, partially invariant, local features produced by the convolutional layer u (440), as illustrated by Equation (4):

$$v = \max_{i=1, \ldots, I} \{u_i\} \qquad \text{Equation (4)}$$

2.2.4 Fully-Connected Layers h and y:

The fixed sized global feature vector representing the max-pooling layer v (460) of Equation (4) is then fed to several additional affine network layers, which are stacked and interleaved with nonlinear activation functions, to extract highly non-linear features at the output layer y (480). In the neural network model illustrated by FIG. 4, a hidden layer h (485) is provided by Equation (5), and the output layer y (480) is provided by Equation (6), as follows:

$$h = \tan h(W_1^T v) \qquad \text{Equation (5)}$$

$$y = \tan h(W_2^T h) \qquad \text{Equation (6)}$$

where $W_1$ and $W_2$ are machine-learned linear projection matrices (490 and 495, respectively). Also note that, the above paragraphs provide a description of the neural network used in the DSM. In practice, the neural networks for source document and target document could be different ones, as long as the sizes of the final (output) layers of the two neural networks are the same (as required by equation (8)).

2.3 Exemplary Loss Function for Learning the DSM:

The following paragraphs describe various ways in which the Interestingness Modeler automatically learns parameters of the DSM of FIG. 4, i.e., ways in which $\theta = \{W_c, W_1, W_2\}$ are learned. Note that this assumes that the source document and the target document share the same neural network. Otherwise, there are two sets of $\theta$, one for source document and one for the target document. Further, it should be noted that additional layers can be added to the DSM without departing from the intended scope of the Interestingness Modeler. In various implementations, the design of the loss function used by the Interestingness Modeler is based on a pairwise learning-to-rank paradigm, although other loss function designs can be adapted for use by the Interestingness Modeler.

For example, consider a source document s and two candidate target documents $t_1$ and $t_2$, where $t_1$ is more interesting than $t_2$ to a user when reading s. The Interestingness Modeler constructs two pairs of documents (s, $t_1$) and (s, $t_2$), where the former is preferred and typically has a higher interestingness score. Let $\Delta$ be the difference of their interestingness scores, following Equation 1. Namely:

$$\Delta = \sigma(s, t_1) - \sigma(s, t_2) \qquad \text{Equation (7)}$$

where $\sigma$ is defined as the cosine similarity:

$$\sigma(s, t) \equiv sim_\theta(s, t) = \frac{y_s^T y_t}{\|y_s\| \|y_t\|} \qquad \text{Equation (8)}$$

where $y_s$ and $y_t$ are the feature vectors of s and t, respectively, which are generated using the DSM, parameterized by $\theta$. Intuitively, the idea is to learn $\theta$ to maximize $\Delta$. That is, the DSM is learned to represent documents as points in a hidden interestingness space, where the similarity between a document and its corresponding interesting documents is maximized.

In various implementations, the Interestingness Modeler uses the following logistic loss over $\Delta$, which can be shown to upper bound the pairwise accuracy, although should be understood that other loss functions can be used to implement the training process described herein without departing from the scope of the Interestingness Modeler:

$$\mathcal{L}(\Delta; \theta) = \log(1 + \exp(-\gamma \Delta)) \qquad \text{Equation (9)}$$

The loss function in Equation (9) has a shape similar to a hinge loss used in support vector machines (SVMs). However, because of the use of the cosine similarity function, a scaling factor $\gamma$ is added that magnifies $\Delta$ from [−2, 2] to a larger range. Empirically, the value of $\gamma$ makes no difference as long as it is large enough. In various tested implementations, the value of $\gamma$ is set as $\gamma = 10$, though other values can clearly be used for $\gamma$. Because the loss function is differentiable, optimizing the model parameters can be done using any of a variety of gradient-based methods, such as L-BFGS (i.e., limited-memory Broyden-Fletcher-Goldfarb-Shanno), Stochastic Gradient Descent (SGD), etc.

2.4 Training the DSM:

In various tested implementations, deep semantic models were trained on a training corpus such as the data sets described above (e.g., Wikipedia® page browsing events or the like), using mini-batch Stochastic Gradient Descent (SGD), although it should be understood that other machine learning techniques can be used for this training process. In various implementations, mini-batch size was set to 256 source-target document pairs, although it should be understood that mini-batch size can be set to any desired number of source-target document pairs for training purposes.

For each source document s, the Interestingness Modeler randomly selects from that batch four target documents which are not paired with s as negative training samples, although more or fewer negative training examples can be used for this purpose. Therefore, each mini-batch contains 256×5 training samples (e.g., one paired target and four negative examples).

Unless otherwise stated, the deep semantic model used in the tested implementations discussed below follows the architecture illustrated in FIG. 4. However, it should be understood that the optimal architecture can vary depending on the task for which the DSM is being trained (e.g., contextual entity searches, automatic text highlighting, prefetching documents, etc.). Consequently, in various implementations, the Interestingness Modeler searches for the optimal model architecture for every specific task, resulting in task-specific DSMs that are optimally trained for particular tasks. However, the architecture illustrated in FIG. 4 provides a fixed architecture that has been observed to provide acceptable results all task types tested.

Given that the optimization problem is not convex, proper initialization is expected to reduce the training time and to make the learning converge to a more accurate local optimum. In various tested implementations, the network weights were initialized with uniform distribution in a range between $-\sqrt{6/(\text{fanin}+\text{fanout})}$ and $\sqrt{6/(\text{fanin}+\text{fanout})}$, where "fanin" and "fanout" are the numbers of input and output nodes, respectively. However, it should be understood that network weights can be initialized using any desired weighting process without departing from the intended scope of the Interestingness Modeler.

In principle, the loss function of Equation (9) can be further regularized (e.g., by adding a term of $L_2$ norm) to deal with overfitting. However, results obtained from DSMs trained using a simpler early stop approach were observed to be approximately equivalent to results obtained through further regularization of the loss function. The early stop approach adjusts the learning rate $\eta$ during the course of model training. For example, assuming an initial value of $\eta=1.0$, after each epoch (i.e., a pass over the entire training data), the learning rate is adjusted as $\eta=0.5\times\eta$ (or any other desired weight) if the loss on validation data is not reduced. The training stops if either $\eta$ is smaller than a preset threshold or the loss on training data can no longer be reduced significantly. In various tested implementations, it was observed that DSM training typically converges within about 20 epochs.

As noted above, the Interestingness Modeler is applicable for a wide range of tasks, including, but not limited to contextual entity search, automatic highlighting, document prefetching, document or item recommendation systems, advertisement placement systems, etc. The following discussion describes how the source and target documents may be represented for training, and how the focus is determined. As discussed above, it is assumed that there is no document structure other than plain text, although when such information exists, it can be used in model training, if desired. In various tested implementations, document structural information (e.g., hyperlinks, XML tags, etc.) was removed from the documents, and those documents were then each converted into plain text, which is white-space tokenized and lowercased (although other plain text formats may also be used). Numbers are retained and no stemming is performed. In view of this plain-text format, the following paragraphs described task-specific training for exemplary usage scenarios.

2.4.1 Training the DSM for Contextual Entity Searches:

In various tested implementations, when training the DSM for contextual entity searches, the context of a source document s consists of the highlighted text span and its surrounding text defined by a 200-word window (or other size window) covering text before and after the highlighted text. Note that in the event that the highlighted text span is at the beginning or end of a document, the window size may be reduced depending on the amount of text, if any, preceding or following the highlighted span. The focus in s is the highlighted text span. A target document t consists of the plain text of a webpage. The focus in t is defined as the first 10 tokens or words in t, although as discussed above, the focus can be larger or smaller, and need not be limited to the first words in the document.

2.4.2 Training the DSM for Automatic Highlighting and Prefetching:

In various tested implementations, when training the DSM both automatic highlighting and prefetching tasks, these tasks were simulated as follows. Specifically, all candidate concepts, entities and topics that may interest the reader of a document are drawn from the set of anchors in that document. For each document-anchor pair, a source-target pair (s,t) is represented as follows. The source document s is the plain text of the document that the user is reading. The focus in s is the anchor text. The target document t is represented as the plain text of the document linked to the anchor. The focus in t is defined as the first 10 tokens or words in t, although the focus can be larger or smaller, and need not be limited to the first words in the document.

2.5 Using the DSM:

In various tested implementations, the DSM was used in various ways to enable the three above-described interestingness tasks: (1) as a feature generator; and (2) as a direct implementation of the interestingness function σ.

With respect to feature generation, the output layer of the DSM can be seen as a set of semantic features, which can be incorporated in models trained discriminatively on the task-specific data. Given a source-target document pair (s,t), the DSM generates 600 features (i.e., 300 from the output layers $y_s$ and $y_t$ for each s and t, respectively). However, as discussed above in Section 2.2.2, it should be understood that the use of 300 dimensions is a simple design choice used for testing purposes and that any number of dimensions can be used.

With respect to direct implementation of the interestingness function 6, as discussed above, the interestingness score for a document pair is measured using the cosine similarity between their corresponding feature vectors ($y_s$ and $y_t$). Similarly at runtime, $\sigma=\text{sim}_\theta(s,t)$ is defined as Equation (8). However, it should be understood that the resulting feature vectors may be mapped into a variety of spaces with any of a variety of distance or similarity measures then being applied to the resulting feature vectors to compute interestingness scores.

2.5.1 Using the Trained DSM for Contextual Entity Searches:

In this task, a user highlights a text span representing an entity in a document that she is interested in learning more about, and relevant content is retrieved. To map the task to the interestingness function σ of Equation (1), the Interestingness Modeler represents the source and target documents as described above. Given the highlighted text span, the Interestingness Modeler retrieves a candidate set of target documents from the Web, or any other document store or database, by issuing the highlighted text as a query to a search engine or the like. The Interestingness Modeler then uses the trained DSM to automatically select k target documents from the candidate set that are maximally interesting to the user.

As noted above, the DSM is used to accomplish this task in two different settings, including as a direct implementation of σ (single model) and as a feature generator for a learning a discriminative model (e.g., a learned ranker). For the ranker implementation of σ(s,t), the Interestingness Modeler uses a boosted decision tree, which incorporates a large number of ranking features, as discussed in further detail below, along with the DSM features.

For example, in a tested implementation, a data set was generated by randomly sampling a document set from a traffic-weighted set of Web documents. The Interestingness Modeler then used existing named entity recognizer-based techniques to extract entities (e.g., links, people, places, things, etc.) from the documents. Each entity name was then issued as a query to a search engine, and the top-100 retrieved documents were retained as candidate target documents (though any desired number can be retained for training purposes).

Next, for each entity name, the Interestingness Modeler generated a list of source-target document pairs using the techniques described above in Section 2.4.1, one for each target document. The resulting data set contained 10,000 source documents (though there is no significance to this number, and any number of source documents can be used). For the particular set of source documents considered in various tested implementations, each source document is associated with an average of 87 target documents (again, there is no particular significance to this number). Finally, the source-target document pairs were manually labeled in terms of interestingness and used to train a boosted ranker model (though this same information can be used to train any of a variety of discriminative models. For purposes of explanation, assume that these labels were on a 5-level scale, 0 to 4, with 4 meaning the target document is the most interesting to the source document and 0 meaning the target is of no interest, although any desired scale can be used for this purpose.

The resulting models were then used to implement various applications, including, but not limited to a ranking application where k interesting documents are displayed or presented to the user, and an application where all interesting documents are presented to the user. For example, in the case of the top-k ranked documents, these top-k documents (or links to these documents) are presented to user sorted according to their interestingness scores. In the case where all documents are presented to the user, all target documents with an interestingness score exceeding a predefined (or user adjustable) threshold.

Various existing ranking techniques, such as bilingual topic models (BLTM), for example, use a generative model where semantic representation is a distribution of hidden semantic topics that is learned using Maximum Likelihood Estimation in an unsupervised manner, i.e., maximizing the log-likelihood of the source-target document pairs in the training data. In contrast, the DSM learned by the Interestingness Modeler represents documents as points in a hidden semantic space using a supervised learning method, i.e., paired documents are closer in that latent space than unpaired ones. In other words, the model parameters of the DSM are discriminatively trained using an objective that is tailored to particular interestingness tasks, as noted above.

In addition to the difference in training methods, DSM and techniques such as BLTM also use different model structures. For example, BLTM treats a document as a bag of words (thus losing some contextual information such as word order and inter-word dependencies), and generates semantic representations of documents using linear projection. DSM, on the other hand, treats text as a sequence of words in order to capture both local and global context, and to generate highly non-linear semantic features via a deep neural network.

In the ranker setting, the interestingness function a used by the Interestingness Modeler is defined as a boosted tree ranker, which uses a large number of features extracted from (s,t). In various implementations, the ranker was trained using the labeled data set described above. As summarized above, this data set contained 10,000 source documents, each with 87 target documents on average. The parameters of the ranker are trained to optimize directly a normalized discounted cumulative gain (NDCG) score computed on the training data. Rounds of boosting are performed, and at each iteration, a regression tree is constructed using all pairs in the training data. The final number of trees is then chosen based on the validation data.

While the resulting ranker, used as a single model, has been observed to be quite effective, integrating the DSM score computed in Equation (8) as one single feature into the ranker leads to a significant improvement over this single model baseline. Additional improvements in DSM performance were obtained by incorporating the DSM feature vectors of source and target documents (i.e., 600 features in total, assuming the use K=300 semantic features or topics for both the source and target documents) in the ranker.

2.5.2 Using the Trained DSM for Highlighting and Prefetching Tasks:

For the highlighting task, applications enabled by the Interestingness Modeler select the k most interesting text spans in a source document. Similarly, in the prefetching task, applications enabled by the Interestingness Modeler prefetch up to k documents such that the next user click is likely to be one of the cached documents. In various implementations, the Interestingness Modeler casts and implement both of these tasks via the same interestingness model, though with different purposes Both of these tasks can be trained on the type of data sets of source and target documents described above (e.g., Wikipedia® page transitions or other data sets). Given the data set (or multiple training data sets), the Interestingness Modeler uses the set of anchors in each source document s to simulate the set of candidate things that may be of interest to the user while reading s. Further, the Interestingness Modeler treats the text of a document that is linked by an anchor in the source document s as a target document t.

The Interestingness Modeler casts the tasks of highlighting and prefetching as selecting the k anchors that maximize an aggregate cumulative degree of interest in all documents linked to by the anchors. Note that in a tested implementation, when a click is recorded, that click is mapped to the first occurring anchor that links to the clicked page. However, there is no requirement for mapping to the first anchor, and any anchor, or multiple anchors, can be used for mapping purposes.

Thus, assuming mapping to the first anchor, this can be formally stated as follows. Let $A_s$ be the set of all anchors in s and let $t_a$ be the target document linked to by anchor $a \in A_s$. The Interestingness Modeler then selects the k anchors in $A_s$ that maximize the cumulative interest, according to:

$$\underset{A_s^k = (a_1, \ldots, a_k \,|\, a_i \in A_s)}{\operatorname{argmax}} \sum_{a_i \in A_s^k} \sigma(s, t_{a_i}) \qquad \text{Equation (10)}$$

where $\sigma(s, t_a) = 0$ for all $a \notin A_s$.

Features used for training can be categorized as either non-semantic or semantic. Non-semantic features (NSF) are derived from the source document s and from user session information in the browser log. Non-semantic document features include, but are not limited to, position of the anchor in the document, frequency of the anchor, and anchor density in the paragraph. Non-semantic user session features include, but are not limited to, city, country, postal code, region, state and time zone of the user, as well as day of week, hour, weekend vs. workday of the occurrence of the transition, user age, user gender, user education, user income, etc. Some or all of these non-semantic features may or may not be available from the browser logs or user profile information. In contrast, semantic features are computed from source and target documents of each browsing transition. In various tested implementations of the Interestingness Modeler semantic features were obtained either from the full DSM or a version of the DSM purged of its convolutional layer u and max-pooling layer v), both using the output layers as feature generators as described above in Section 2.5.

To train the DSM to for the above-described tasks, the Interestingness Modeler selects anchors in the training set various ways. For example in various implementations, the Interestingness Modeler selects k random anchors (RAND). In other implementations, the Interestingness Modeler selects the first k anchors in each document. In further implementations, the Interestingness Modeler selects the last k anchors in each document. Clearly, other anchor selection scenarios can be used without departing from the intended scope of the Interestingness Modeler.

Note that although the above-described task setting allows access to the content of both source and target documents, there are practical scenarios where a system can predict what interests the user without looking at the target document because the extra step of identifying a suitable target document for each candidate concept, topic or entity of interest is prohibitively inefficient. Such scenarios are also enabled by the Interestingness Modeler. Note also that in cases where features are only drawn from the source document, it has been observed that the use of semantic features significantly boosts the performance of the DSM relative to NSF alone. However improved performance is obtained by using features from both source and target documents.

2.6 Additional Implementations and Considerations:

In various implementations, the DSM learned by the Interestingness Modeler is further improved by extending the process for modeling interestingness given an entire user session, which consists of a sequence of browsing events. In particular, the prior browsing and interaction history recorded in the session provides additional signals for predicting interestingness. To capture such signals, the model is extended to model time series (e.g., causal relations and consequences of actions). A variety of models can be used for such purposes. For example, architecture based on recurrent neural networks can be incorporated into the deep semantic model described herein to model user sessions.

Figure 5:
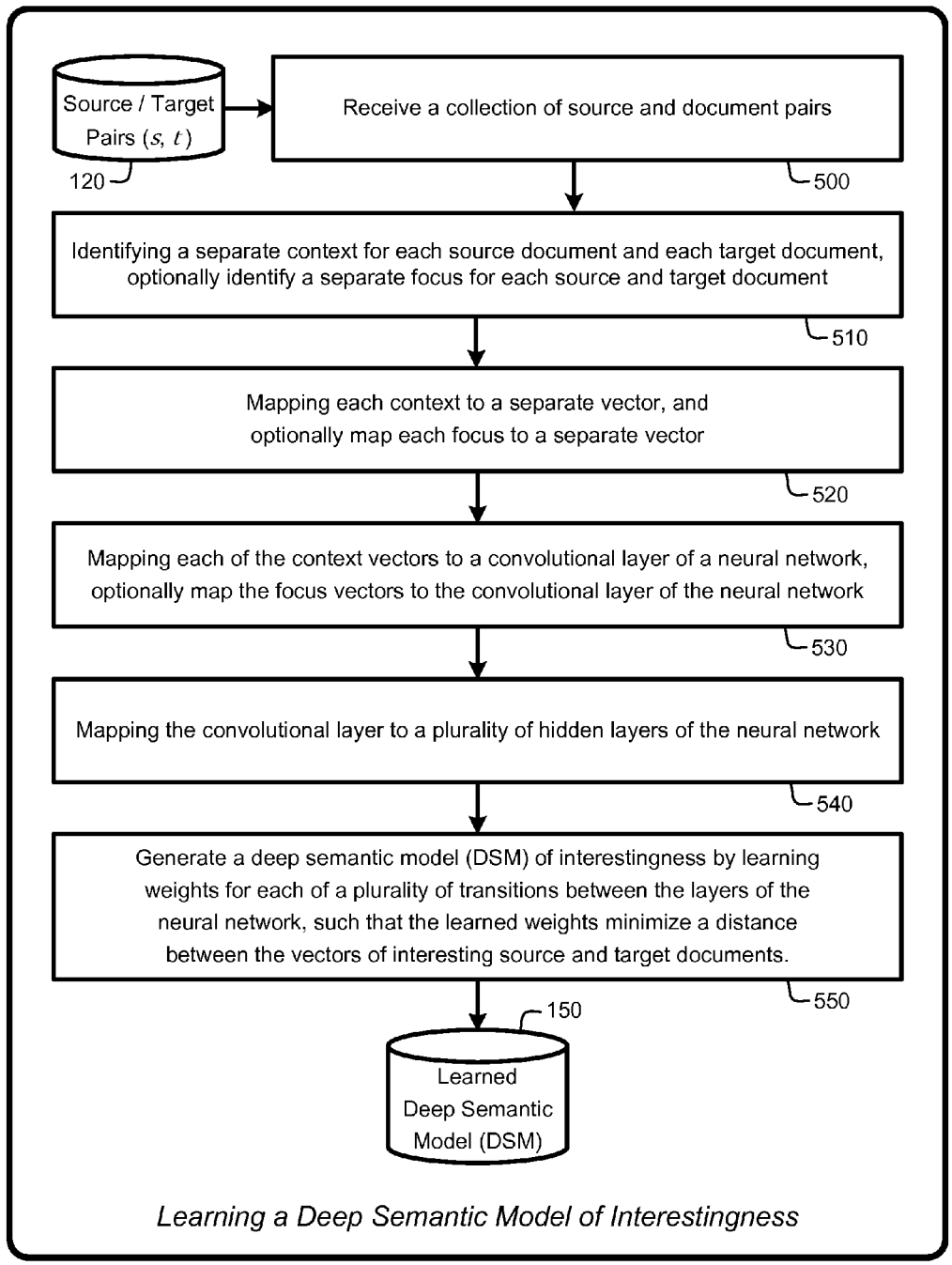
FIG. 5 illustrates a general system flow diagram that illustrates exemplary methods for implementing various implementations of the Interestingness Modeler, as described herein.

3.0 Operational Summary of the Interestingness Modeler:

Some of processes described above with respect to FIG. 1 through FIG. 4, and in further view of the detailed description provided above in Sections 1 and 2, are illustrated by the general operational flow diagram of FIG. 5. In particular, FIG. 5 provides an exemplary operational flow diagram that summarizes the operation of some of the various implementations of the Interestingness Modeler. Note that FIG. 5 is not intended to be an exhaustive representation of all of the various implementations of the Interestingness Modeler described herein, and that the implementations represented in FIG. 5 are provided only for purposes of explanation.

Further, it should be noted that any boxes and interconnections between boxes that may be represented by broken or dashed lines in FIG. 5 represent optional or alternate implementations of the Interestingness Modeler described herein. In addition, any or all of these optional or alternate implementations, as described below, may be used in combination with other alternate implementations that are described throughout this document.

In general, as illustrated by FIG. 5, the Interestingness Modeler begins creation of the DSM by receiving (500) a collection or set of source and document pairs 120. The Interestingness Modeler then identifies (510) a separate context for each source document and each target document in the set of source and target document pairs 120. In addition, the Interestingness Modeler optionally identifies a separate focus for each source document and each target document.

Next, the Interestingness Modeler maps (520) each context to a separate vector, and optionally maps each focus to a separate vector. Once these vectors have been created, the Interestingness Modeler then maps (530) each of the context vectors to a convolutional layer of a neural network, and also optionally maps the focus vectors to the convolutional layer of the neural network. Note also that if a focus is identified for a document, then the Interestingness Modeler will map both the focus and context of that document into one vector. The Interestingness Modeler then continues by mapping (540) the convolutional layer to a plurality of hidden layers of the neural network.

Finally, the Interestingness Modeler generates (550) a learned DSM 150 of interestingness by learning weights for each of a plurality of transitions between the layers of the neural network, such that the learned weights minimize a distance between the vectors of interesting source and target documents. As discussed throughout this document, the learned DSM is then made available for a number of uses, including, but not limited to using features of the DSM to construct ranking models and the like.

Figure 6:
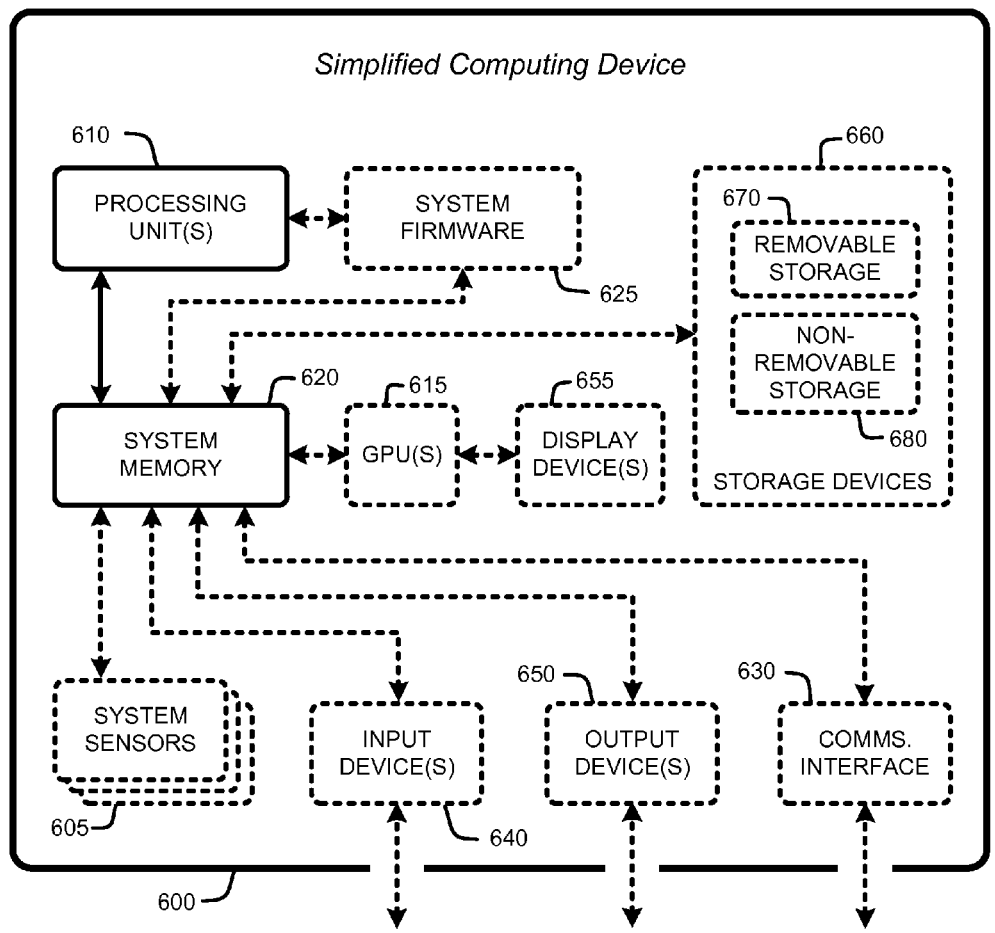
FIG. 6 is a general system diagram depicting a simplified general-purpose computing device having simplified computing and I/O capabilities for use in implementing various implementations of the Interestingness Modeler, as described herein.

4.0 Exemplary Operating Environments:

The Interestingness Modeler described herein is operational within numerous types of general purpose or special purpose computing system environments or configurations. FIG. 6 illustrates a simplified example of a general-purpose computer system on which various implementations and elements of the Interestingness Modeler, as described herein, may be implemented. It should be noted that any boxes that are represented by broken or dashed lines in FIG. 6 represent alternate implementations of the simplified computing device, and that any or all of these alternate implementations, as described below, may be used in combination with other alternate implementations that are described throughout this document.

For example, FIG. 6 shows a general system diagram showing a simplified computing device 600. Examples of such devices operable with the Interestingness Modeler, include, but are not limited to, portable electronic devices, wearable computing devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that the Interestingness Modeler may be implemented with any touchscreen or touch-sensitive surface that is in communication with, or otherwise coupled to, a wide range of electronic devices or objects.

To allow a device to implement the Interestingness Modeler, the computing device 600 should have a sufficient computational capability and system memory to enable basic computational operations. In addition, the computing device 600 may include one or more sensors 605, including, but not limited to, accelerometers, cameras, capacitive sensors, proximity sensors, microphones, multi-spectral sensors, etc. Further, the computing device 600 may also include optional system firmware 625 (or other firmware or processor accessible memory or storage) for use in implementing various implementations of the Interestingness Modeler.

As illustrated by FIG. 6, the computational capability of computing device 600 is generally illustrated by one or more processing unit(s) 610, and may also include one or more GPUs 615, either or both in communication with system memory 620. Note that that the processing unit(s) 610 of the computing device 600 may be a specialized microprocessor, such as a DSP, a VLIW, or other micro-controller, or can be a conventional CPU having one or more processing cores, including specialized GPU-based cores in a multi-core CPU.

In addition, the simplified computing device 600 may also include other components, such as, for example, a communications interface 630. The simplified computing device 600 may also include one or more conventional computer input devices 640 or combinations of such devices (e.g., touchscreens, touch-sensitive surfaces, pointing devices, keyboards, audio input devices, voice or speech-based input and control devices, video input devices, haptic input devices, devices for receiving wired or wireless data transmissions, etc.). The simplified computing device 600 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device 600 may also include a variety of computer readable media. Computer readable media can be any available media that can be accessed via storage devices 660 and includes both volatile and nonvolatile media that is either removable 670 and/or non-removable 680, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various implementations of the Interestingness Modeler described herein, or portions thereof, may be stored, received, transmitted, or read from any desired combination of computer or machine readable media or storage devices and communication media in the form of computer executable instructions or other data structures.

Finally, the Interestingness Modeler described herein may be further described in the general context of computer-executable instructions, such as program modules, being executed by a computing device. Generally, program modules include routines, programs, objects, components, data structures, etc., that perform particular tasks or implement particular abstract data types. The implementations described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Interestingness Modeler has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the Interestingness Modeler. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process, comprising:
applying a computer to perform process actions for:
receiving a collection of source and target document pairs;
identifying a separate context for each source document, the context for each source document comprising a selection within the source document and a window of multiple words in the source document around that selection;
identifying a separate context for each target document, the context for each target document comprising a first fixed number of the first words in that target document;
mapping each context to a separate vector;
mapping each of the vectors to a convolutional layer of a neural network;
mapping the convolutional layer to a plurality of hidden layers of the neural network;
generating a learned interestingness model by learning weights for each of a plurality of transitions between the layers of the neural network, such that the learned weights minimize a distance between the vectors of the contexts of the source and target documents;
the interestingness model configured to determine a conditional likelihood of a user interest in transitioning to an arbitrary target document when that user is consuming an arbitrary source document in view of a context extracted from that arbitrary source document and a context extracted from that arbitrary target document; and
applying the interestingness model to recommend one or more arbitrary target documents to the user relative to an arbitrary source document being consumed by the user.

2. The computer-implemented process of claim 1 further comprising:
identifying a focus for each source document and each target document; and
wherein the separate vectors are constructed by mapping the focus and context of each source document and each target document to the separate vectors.

3. The computer-implemented process of claim 2 wherein the focus of a source document is one or more selected words in the source document.

4. The computer-implemented process of claim 2 wherein the focus of one or more of the target documents is a fixed number of words at the beginning of the target document.

5. The computer-implemented process of claim 1 further comprising applying the learned interestingness model to one or more arbitrary source documents to extract semantic features from those arbitrary source documents.

6. The computer-implemented process of claim 1 further comprising applying the learned interestingness model to one or more arbitrary target documents to extract semantic features from those arbitrary target documents.

7. The computer-implemented process of claim 1 further comprising generating feature vectors from an output layer of the learned interestingness model, and applying those feature vectors as input to train a discriminative model.

8. The computer-implemented process of claim 7 wherein the discriminative model is a boosted tree ranker trained by performing a plurality of iterations of boosting rounds, with each round constructing a regression tree.

9. The computer-implemented process of claim 7 wherein the discriminative model is used to automatically highlight interesting content in an arbitrary document being consumed by the user.

10. The computer-implemented process of claim 7 wherein the discriminative model is used to automatically perform contextual entity searches, for one or more entities automatically identified in an arbitrary document being consumed by the user, for entities likely to be of interest to the user.

11. The computer-implemented process of claim 7 wherein the discriminative model is used to automatically prefetch one or more documents likely to be of interest to a user consuming an arbitrary document.

12. The computer-implemented process of claim 7 wherein the discriminative model is used to automatically recommend one or more items that are likely to be of interest to a user consuming an arbitrary document.

13. The computer-implemented process of claim 1 wherein the neural network is constructed from layers comprising:
an input layer comprising vectors derived from the context;
the convolutional layer connected to the input layer via a first linear projection matrix, the convolutional layer extracting semantic features from the vectors of the input layer;
a max pooling layer connected to the convolutional layer via a max pooling operation;
the plurality of hidden layers connected to the max pooling layer via a second linear projection matrix; and
an output layer connected to the plurality of hidden layers via a third linear projection matrix.

14. The computer-implemented process of claim 1 wherein the context of one or more of the source documents is one or more anchors in combination with a window of words around the anchor.

15. The computer-implemented process of claim 1 wherein the context of one or more of the source documents is a predefined size window of words around each of a plurality of entities identified in those source documents.

16. A system comprising:
a general purpose computing device; and
a computer program comprising program modules executable by the computing device, wherein the computing device is directed by the program modules of the computer program to:
receive a collection of source and target document pairs;
identify a separate focus and a separate context for each source document and each target document;
the context of each source document comprising a selection of one or more words within the source document and a window of multiple words in the source document around that selection;
the focus of each source document comprising a selected anchor within the source document;
the context of each target document comprising a first fixed number of the first words in that target document;
the focus of each target document comprising a second fixed number of the first words in that target document, the second fixed number being smaller than the first fixed number;
map the words of each focus to a separate vector and the words of each context to a separate vector;
for each document, concatenate the corresponding focus and context vectors into a combined vector;
map each of the combined vectors to a convolutional layer of a neural network;
map the convolutional layer to a hidden layer of the neural network;
generate a learned interestingness model by learning weights for each of a plurality of transitions between the layers of the neural network, such that the learned weights minimize a distance between the combined vectors of the source and target documents;
the interestingness model configured to determine a conditional likelihood of a user interest in transitioning to an arbitrary target document when that user is consuming an arbitrary source document in view of a context extracted from that arbitrary source document and a context extracted from that arbitrary target document; and
applying the interestingness model to recommend one or more arbitrary target documents to the user relative to an arbitrary source document being consumed by the user.

17. The system of claim 16 further comprising generating feature vectors from an output layer of the learned interestingness model, and applying those feature vectors as input to train a discriminative model.

18. The system of claim 16 wherein mapping the words of each focus to a separate vector further comprises forming a one-hot vector and a tri-letter vector for each word in each focus.

19. A computer-readable storage device having computer executable instructions stored therein, said instructions causing a computing device to execute a method comprising:
receiving a collection of source and target document pairs;
identifying a separate context for each source document and each target document;
the context for each source document comprising a selection within the source document and a window of multiple words in the source document around that selection;
the context for each target document comprising a first fixed number of the first words in that target document;
mapping each context to a separate vector;
mapping each of the vectors to a convolutional layer of a neural network;
mapping the convolutional layer to a plurality of hidden layers of the neural network;
generating a learned interestingness model by learning weights for each of a plurality of transitions between the layers of the neural network, such that the learned weights minimize a distance between the vectors of the source and target documents; and
training a discriminative model from an output layer of the learned interestingness model; and
applying the discriminative model to automatically highlight content in an arbitrary document being consumed by that user.

* * * * *